US012811621B2

(12) United States Patent
Tsai et al.

(10) Patent No.: US 12,811,621 B2
(45) Date of Patent: Nov. 24, 2026

(54) RADIO FREQUENCY TRANSCEIVER CIRCUIT AND ASSOCIATED CIRCUIT SET

(71) Applicant: Realtek Semiconductor Corp., HsinChu (TW)

(72) Inventors: Ping-Hsuan Tsai, HsinChu (TW); Chia-Jun Chang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 28 days.

(21) Appl. No.: 19/071,769

(22) Filed: Mar. 6, 2025

(65) Prior Publication Data

US 2025/0309936 A1 Oct. 2, 2025

(30) Foreign Application Priority Data

Mar. 27, 2024 (TW) .................................. 113111364

(51) Int. Cl.
*H04B 1/40* (2015.01)

(52) U.S. Cl.
CPC ...................................... *H04B 1/40* (2013.01)

(58) Field of Classification Search
CPC ................... H04B 1/40; H04B 1/0475; H04B 2001/0425; H03G 3/3042; H03F 1/3247; H03F 2200/294
See application file for complete search history.

(56) References Cited

U.S. PATENT DOCUMENTS

| | | | | |
|---|---|---|---|---|
| 8,340,602 B1 * | 12/2012 | Peiris | .................... | H03F 1/3241 455/114.3 |
| 8,380,144 B1 * | 2/2013 | Bai | ...................... | H04B 1/0475 375/296 |
| 2005/0070231 A1 | 3/2005 | Jensen | | |
| 2006/0178165 A1 * | 8/2006 | Vassiliou | ................. | H04B 1/30 455/132 |
| 2016/0105299 A1 * | 4/2016 | Chee | .................... | H04B 1/0475 375/297 |

OTHER PUBLICATIONS

Tsai et al., the specification, including the claims, and drawings in the U.S. Appl. No. 18/820,179, filed Aug. 29, 2024.

* cited by examiner

*Primary Examiner* — Vineeta S Panwalkar
(74) *Attorney, Agent, or Firm* — Winston Hsu

(57) ABSTRACT

A radio frequency (RF) transceiver circuit includes a pre-distortion processing circuit, wherein the pre-distortion processing circuit includes a first filter, a mixer, a second filter, an analog-to-digital converter, and a digital processing circuit. The first filter filters a feedback signal to filter out harmonic components of the feedback signal in order to generate a filtered signal. The mixer performs a down-conversion operation upon the filtered signal via an oscillation signal to generate a mixed signal. The second filter performs a low-pass filtering operation upon the mixed signal to generate a low-pass filtered signal. The analog-to-digital converter performs an analog-to-digital conversion operation upon the low-pass filtered signal to generate a digital signal, in order for the digital processing circuit to generate a compensation signal for performing a pre-distortion compensation operation.

9 Claims, 9 Drawing Sheets

RADIO FREQUENCY TRANSCEIVER CIRCUIT AND ASSOCIATED CIRCUIT SET

BACKGROUND OF THE INVENTION

1. Field of the Invention

The present invention is related to radio frequency (RF) design, and more particularly, to an RF transceiver circuit that can generate appropriate signals for performing a pre-distortion operation via specific filter design and a calibration mechanism, and an associated circuit set.

2. Description of the Prior Art

In order to achieve high power output, an external front-end module (eFEM) is usually disposed between an RF transmitter and an antenna. The eFEM, however, often generates non-linear phenomena on the circuit, causing greater distortion in RF signals transmitted through the antenna. In order to address this problem, the RF signals transmitted through the antenna may be obtained from the eFEM for analysis, such that the RF transmitter may perform non-linear compensation via a digital pre-distortion method. Since the RF signals include high-frequency harmonic components and mirror components, and an oscillation signal utilized by a mixer included in a pre-distortion processing circuit for analyzing the RF signals also includes high-frequency harmonic components, the high-frequency harmonic components of the RF signals may be down-converted in a baseband by the high-frequency harmonic components in the oscillation signal, causing multiple baseband signals with different frequencies to appear in the baseband. For example, assuming that a required frequency of a baseband signal is "BB", the frequencies generated after the RF signals are processed by the mixer may be "BB", "2*BB", "3*BB", "−BB", "−2*BB", "−3*BB", . . . , and so on, causing processing difficulties in back-end circuits.

SUMMARY OF THE INVENTION

It is therefore one of the objectives of the present invention to provide an RF transceiver circuit that can generate appropriate signals for performing a pre-distortion operation via specific filter design and a calibration mechanism, and an associated circuit set, in order to address the above-mentioned issues.

According to an embodiment of the present invention, an RF transceiver circuit is provided. The RF transceiver circuit comprises a transmission circuit, a reception circuit, and a pre-distortion processing circuit. The transmission circuit is arranged to generate a transmission signal, wherein the transmission signal is transmitted to an antenna. The reception circuit is arranged to receive a reception signal through the antenna. The pre-distortion processing circuit comprises a first filter, a mixer, a second filter, an analog-to-digital converter, and a digital processing circuit. The first filter is arranged to filter a feedback signal to filter out harmonic components of the feedback signal in order to generate a filtered signal, wherein the feedback signal is generated according to a coupling signal of the transmission signal. The mixer is arranged to perform a down-conversion operation upon the filtered signal via an oscillation signal to generate a mixed signal. The second filter is arranged to perform a low-pass filtering operation upon the mixed signal or an amplified signal to generate a low-pass filtered signal, wherein the amplified signal is generated by an amplifier performing an amplification operation upon the mixed signal. The analog-to-digital converter is arranged to perform an analog-to-digital conversion operation upon the low-pass filtered signal to generate a digital signal. The digital processing circuit is arranged to calculate distortion information of the transmission signal according to the digital signal, in order to generate and transmit a compensation signal to the transmission circuit for performing a pre-distortion compensation operation.

According to an embodiment of the present invention, a circuit set is provided. The circuit set comprises an external front-end module, a coupler, a matching circuit, and an RF transceiver circuit. The external front-end module comprises a power amplifier and a low-noise amplifier, wherein the power amplifier is arranged to amplify a transmission signal for transmitting through an antenna; and the low-noise amplifier is arranged to receive a reception signal through the antenna. The coupler is arranged to generate a coupling signal according to the transmission signal. The matching circuit is arranged to generate a feedback signal according to the coupling signal. The RF transceiver circuit comprises a pre-distortion processing circuit. The pre-distortion processing circuit comprises a first filter, a mixer, a second filter, an analog-to-digital converter, and a digital processing circuit. The first filter is arranged to filter the feedback signal to filter out harmonic components of the feedback signal in order to generate a filtered signal. The mixer is arranged to perform a down-conversion operation upon the filtered signal via an oscillation signal to generate a mixed signal. The second filter is arranged to perform a low-pass filtering operation upon the mixed signal to generate a low-pass filtered signal. The analog-to-digital converter is arranged to perform an analog-to-digital conversion operation upon the low-pass filtered signal to generate a digital signal. The digital processing circuit is arranged to calculate distortion information of the transmission signal according to the digital signal, in order to generate a compensation signal for performing a pre-distortion compensation operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
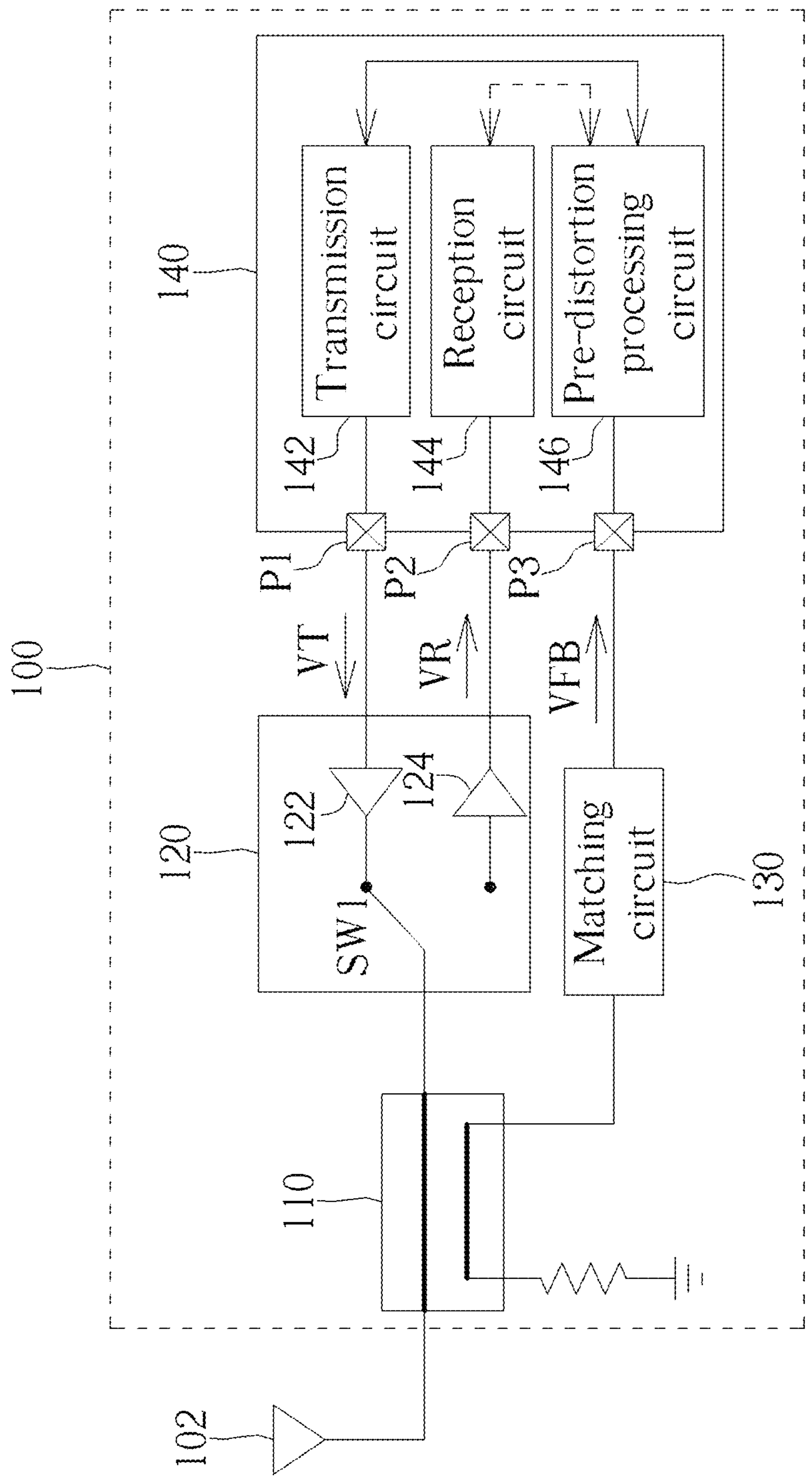
FIG. 1 is a diagram illustrating a circuit set according to an embodiment of the present invention.

FIG. 1 is a diagram illustrating a circuit set 100 according to an embodiment of the present invention. As shown in FIG. 1, the circuit set 100 includes a coupler 110, an external front-end module (eFEM) 120, a matching circuit 130, and a radio frequency (RF) transceiver circuit 140. The RF transceiver circuit 140 is an RF transceiving chip, and includes at least three pins P1-P3, a transmission circuit 142, a circuit a reception 144, and pre-distortion processing circuit 146. The eFEM 120 includes a switch SW1, a power amplifier 122, and a low-noise amplifier 124. In this embodiment, the circuit set 100 may be disposed in any electronic device requiring wireless signal transceiving, and may perform transmission and reception of a wireless signal through an antenna 102.

The RF transceiver circuit 140 is equipped with signal transmission and signal reception functions. Specifically, when the RF transceiver circuit 140 performs a signal transmission operation, the transmission circuit 142 may include a digital-to-analog converter, a mixer, a power amplifier, and other related circuits for generating a transmission signal VT, wherein the transmission signal VT is transmitted to the eFEM 120 through the pin P1 and is amplified by the power amplifier 122, and is transmitted to a remote electronic device through the switch SW1 and the antenna 102. When the RF transceiver circuit 140 performs a signal reception operation, the switch SW1 is switched to the low-noise amplifier 124. A reception signal VR is generated according to a signal received from the antenna 102 through the switch SW1 and the low-noise amplifier 124. The reception circuit 144 receives and processes the reception signal VR through the pin P2.

Due to the non-linear phenomena of the power amplifier included in the transmission circuit 142 and the power amplifier 122 included in the eFEM 120, the transmission signal VT transmitted through the antenna 102 may be distorted. As a result, the present invention designs the coupler 110 and the matching circuit 130 for generating and transmitting a feedback signal VFB to the pre-distortion processing circuit 146 included in the RF transceiver circuit 140, in order to perform a compensation operation upon the transmission signal VT generated by the transmission circuit 142 in advance. Specifically, the transmission circuit 142 may generate multiple test signals as the transmission signal VT, wherein the multiple test signals have different intensities. The coupler 110 may be composed of two coupled transmission cables, and may be arranged to generate a coupling signal according to the transmission signal VT. It should be noted that, since the coupler 110 is disposed between the eFEM 120 and the antenna 102, the transmission signal VT is affected by the power amplifier 122 and is distorted, and the coupling signal reflects the distorted transmission signal VT. The matching circuit 130 may include a resistance matching circuit and/or a gain adjustment circuit (e.g., an attenuator) for adjusting an intensity of the coupling signal and generating the feedback signal VFB, wherein the feedback signal VFB is transmitted to the pre-distortion processing circuit 146 through the pin P3.

Figure 2:
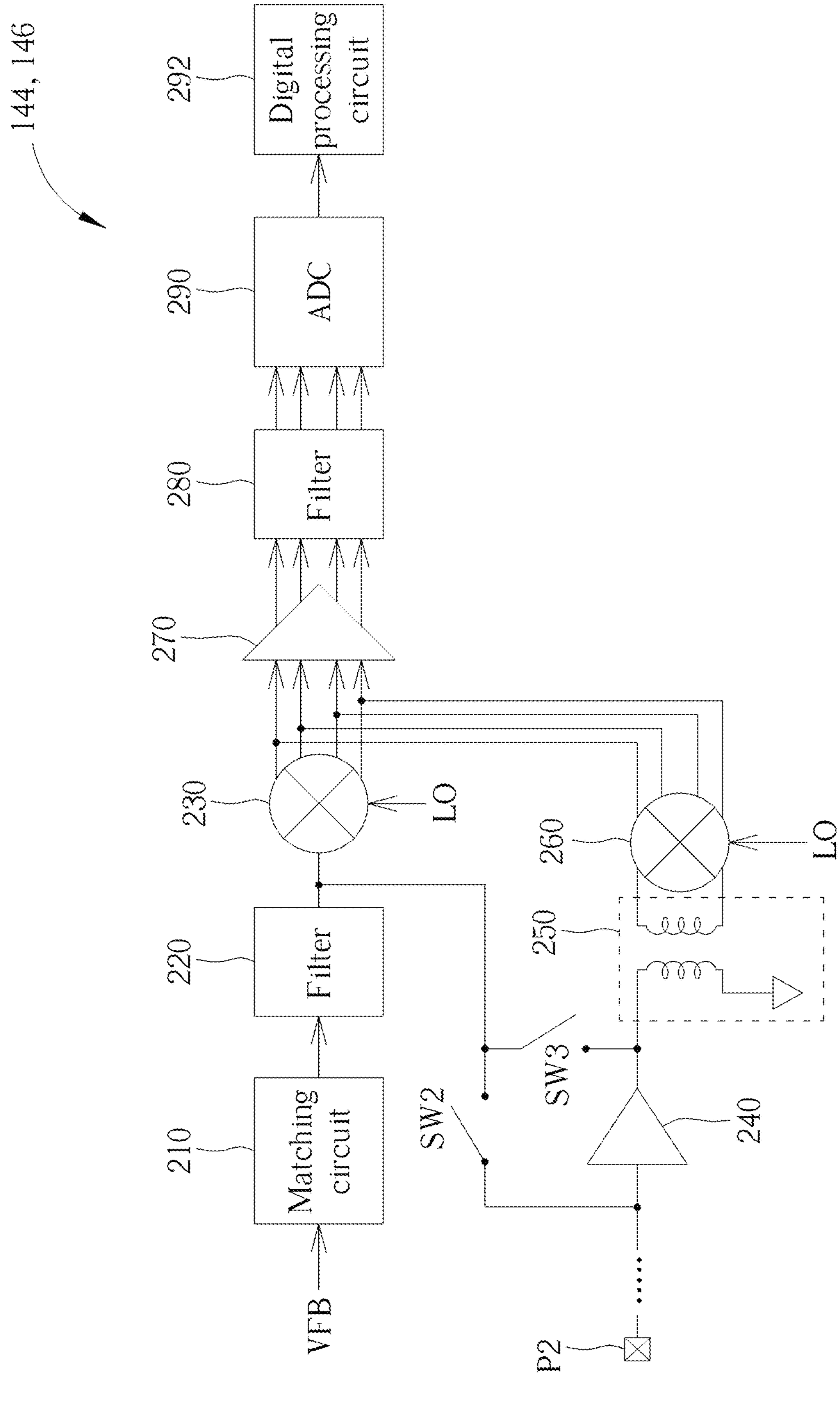
FIG. 2 is a diagram illustrating a reception circuit and a pre-distortion processing circuit according to a first embodiment of the present invention.

FIG. 2 is a diagram illustrating the reception circuit 144 and the pre-distortion processing circuit 146 according to a first embodiment of the present invention. As shown in FIG. 2, the reception circuit 144 and the pre-distortion processing circuit 146 include a matching circuit 210, a filter 220, a mixer 230, a low-noise amplifier 240, two switches SW2 and SW3, a transformer 250, a mixer 260, an amplifier 270, a filter 280, an analog-to-digital converter (ADC) 290, and a digital processing circuit 292. In this embodiment, the low-noise amplifier 240, the transformer 250, and the mixer 260 are components in the reception circuit 144. The pre-distortion processing circuit 146 selectively utilizes the mixer 230 thereof or the mixer 260 included in the reception circuit 144 in order to generate related compensation signals.

In operations of the pre-distortion processing circuit 146, the matching circuit 210 includes a resistance matching circuit. The filter 220 may receive the feedback signal VFB from the matching circuit 210, and filter the feedback signal VFB to select a required frequency and generate a filtered signal. In this embodiment, the required frequency is a main frequency of the transmission signal VT, so that the filter 220 can remove mirror components and harmonic components of the feedback signal VFB. The mixer 230 may perform a down-conversion operation upon the filtered signal via an oscillation signal LO to generate a mixed signal. In this embodiment, the oscillation signal LO may include four oscillation signals with different phases, and the mixer 230 may perform the down-conversion operation upon the filtered signal via the oscillation signal LO to generate four mixed signals, but the present invention is not limited thereto.

The amplifier 270 may amplify the mixed signal to generate an amplified signal. The filter 280 may perform a low-pass filtering operation upon the amplified signal to generate a low-pass filtered signal. The ADC 290 may perform an analog-to-digital conversion operation upon the low-pass filtered signal to generate a digital signal. The digital processing circuit 292 may analyze and process the digital signal to generate and transmit a compensation signal to the transmission circuit 142 for performing the pre-distortion compensation operation. In an embodiment, the digital processing circuit 292 may obtain an original digital signal corresponding to the transmission signal VT (i.e., original digital values of the test signals) from the transmission circuit 142, and calculate distortion information of the transmission signal VT according to a difference between the original digital signal and the digital signal generated by the ADC 290, for generating the compensation signal. It should be noted that, since the operations of the digital processing circuit 292 regarding calculating the distortion information of the transmission signal VT and generating and transmitting the compensation signal to the transmission circuit 142 for performing the pre-distortion compensation operation are well known to those skilled in the art, further descriptions are not repeated in detail here.

In an embodiment, the amplifier 270 may be removed from FIG. 2, and the filter 280 may perform a low-pass filtering operation upon the mixed signal to generate the low-pass filtered signal.

In another embodiment, the RF transceiver circuit 140 may selectively operate in a reception mode or a test mode. When the RF transceiver circuit 140 operates in the reception mode, the reception circuit 144 may obtain the reception signal VR through the antenna 102 and the eFEM 120. The reception signal VR is sequentially processed by the low-noise amplifier 240, the transformer 250, and the mixer 260 for transmitting to a back-end circuit (not shown in FIG. 2). At this moment, the pre-distortion processing circuit 146 may stop operating or be turned off, and the switches SW2 and SW3 may disconnect the connection between the reception circuit 144 and the pre-distortion processing circuit 146.

When the RF transceiver circuit 140 operates in the test mode, the transmission circuit 142 generates multiple test signals as the transmission signal VT, and the coupler 110 generates a coupling signal according to the transmission signal VT, wherein the feedback signal VFB is generated and transmitted to the pre-distortion processing circuit 146 after the coupling signal is processed by the matching circuit 130. At this moment, the switch SW1 within the eFEM 120 is switched to the power amplifier 122, such that the reception circuit 144 will not receive signals from the antenna 102. In addition, one of the switches SW2 and SW3 may be enabled to connect the reception circuit 144 with the pre-distortion processing circuit 146. In related operations, the pre-distortion processing circuit 146 utilizes the mixer 260 to calculate distortion information of the transmission signal VT according to the feedback signal VFB, in order to generate and transmit the compensation signal to the transmission circuit 142 for performing the pre-distortion compensation operation. Specifically, the matching circuit 210 includes a resistance matching circuit. The filter 220 may receive the feedback signal VFB from the matching circuit 210, and filter the feedback signal VFB to select a required frequency and generate a filtered signal. If the switch SW2 is enabled, a processed signal is generated after the filtered signal is processed by the low-noise amplifier 240 and the transformer 250. If the switch SW3 is enabled, a processed signal is generated after the filtered signal is processed by the transformer 250. The mixer 260 may perform a down-conversion operation upon the processed signal via an oscillation signal LO to generate a mixed signal. In this embodiment, the oscillation signal LO may include four oscillation signals with different phases, and the mixer 260 may perform the down-conversion operation upon the filtered signal via the oscillation signal LO to generate four mixed signals, but the present invention is not limited thereto. It should be noted that the mixer 230 may be turned off at this moment. The amplifier 270 may amplify the mixed signal to generate an amplified signal. The filter 280 may perform a low-pass filtering operation upon the amplified signal to generate a low-pass filtered signal. The ADC 290 may perform an analog-to-digital conversion operation upon the low-pass filtered signal to generate a digital signal. The digital processing circuit 292 may analyze and process the digital signal to generate a compensation signal, in order for the transmission circuit 142 to perform the pre-distortion compensation operation.

It should be noted that, in the embodiment of FIG. 2, the pre-distortion processing circuit 146 selectively utilizes the mixer 230 thereof or the mixer 260 included in the reception circuit 144 to generate related compensation signals. In other embodiments, when the pre-distortion processing circuit 146 utilizes the mixer 230 thereof to generate related compensation signals, the switches SW2 and SW3 can be removed from FIG. 2. In another embodiment, when the pre-distortion processing circuit 146 utilizes the mixer 260 included in the reception circuit 144 to generate related compensation signals, since the mixer 260 is a common component of the reception circuit 144 and the pre-distortion processing circuit 146, the mixer 230 can be removed from FIG. 2. These alternative designs all fall within the scope of the present invention.

Figure 3:
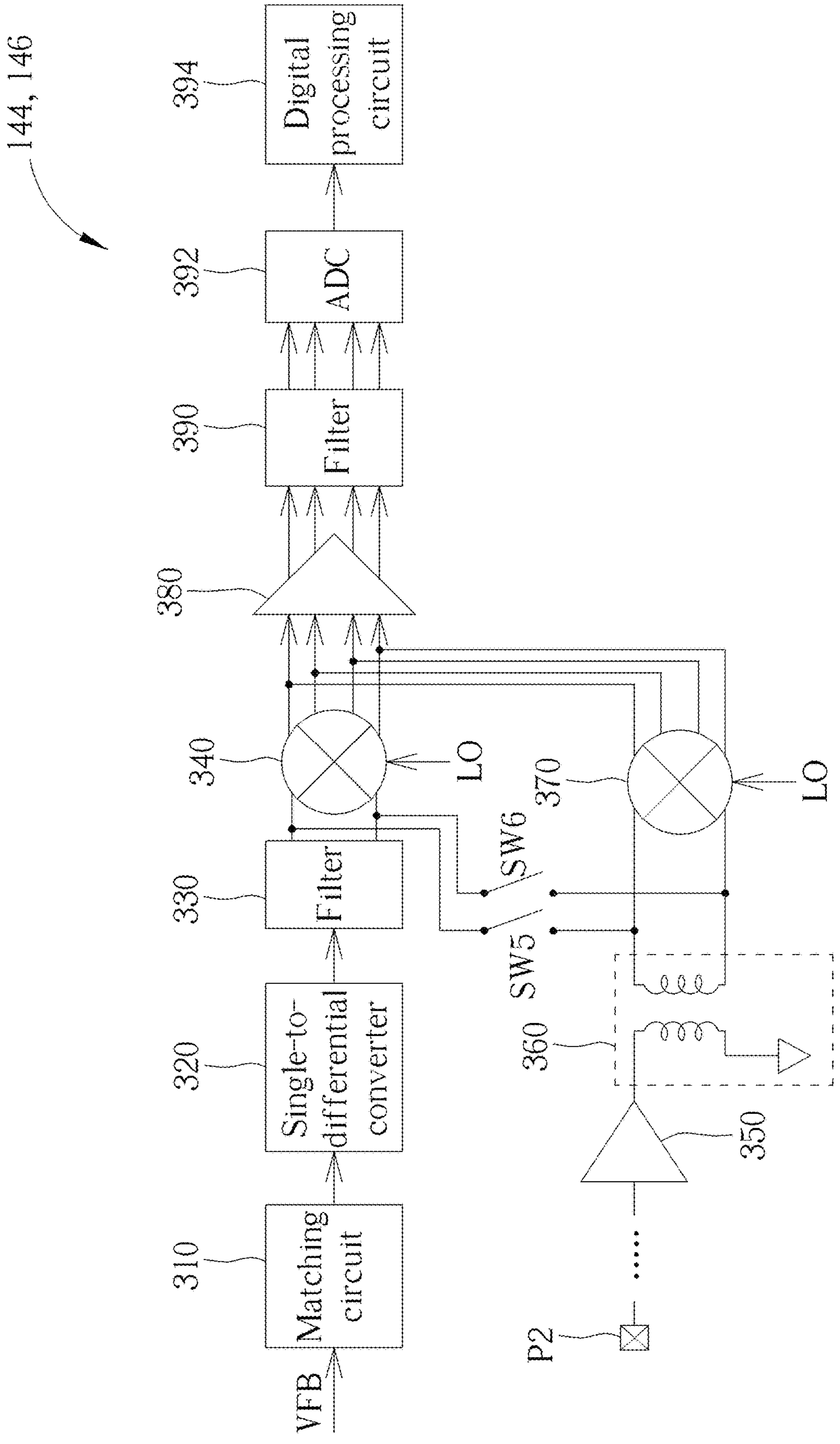
FIG. 3 is a diagram illustrating a reception circuit and a pre-distortion processing circuit according to a second embodiment of the present invention.

FIG. 3 is a diagram illustrating the reception circuit 144 and the pre-distortion processing circuit 146 according to a second embodiment of the present invention. In this embodiment, the reception circuit 144 and the pre-distortion processing circuit 146 include a matching circuit 310, a single-to-differential converter 320, a filter 330, a mixer 340, a low-noise amplifier 350, two switches SW5 and SW6, a transformer 360, a mixer 370, an amplifier 380, a filter 390, an ADC 392, and a digital processing circuit 394. In this embodiment, the low-noise amplifier 350, the transformer 360, and the mixer 370 are components within the reception circuit 144, and the pre-distortion processing circuit 146 may selectively utilize the mixer 340 thereof or the mixer 370 included in the reception circuit 144 to generate related compensation signals.

Since the difference between the embodiments of FIG. 3 and FIG. 2 is the single-to-differential converter 320 and the mixer 370 that receives the filtered signal generated by the filter 330 through the switches SW5 and SW6, whereas the main functions and operations of the matching circuit 310, the filter 330, the mixer 340, the low-noise amplifier 350, the mixer 370, the amplifier 380, the filter 390, the ADC 392, and the digital processing circuit 394 are the same as those of the matching circuit 210, the filter 220, the mixer 230, the low-noise amplifier 240, the mixer 260, the amplifier 270, the filter 280, the ADC 290, and the digital processing circuit 292, respectively, similar descriptions are not repeated in detail here. In addition, the single-to-differential converter 320 is arranged to convert the feedback signal VFB into a differential signal. The filter 330 is arranged to filter the differential signal in order to generate and transmit the filtered signal to the mixer 340.

Figure 4:
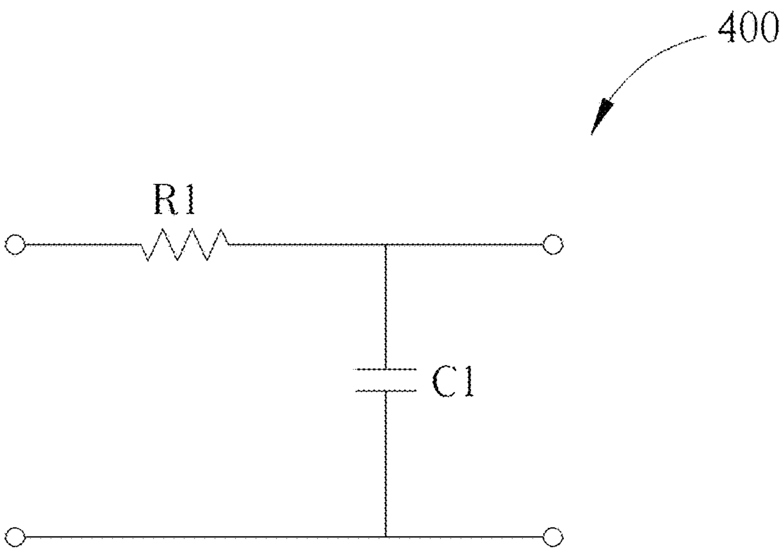
FIG. 4 is a diagram illustrating a filter according to an embodiment of the present invention.

FIG. 4 is a diagram illustrating a filter 400 according to an embodiment of the present invention, wherein the filter 220 shown in FIG. 2 and/or the filter 330 shown in FIG. 3 may be implemented by the filter 400. As shown in FIG. 4, the filter 400 is a low-pass filter including a resistor R1 and a capacitor C1, and is arranged to filter out harmonic components of the feedback signal VFB (e.g., second harmonic components or third harmonic components of the feedback signal VFB).

Figure 5:
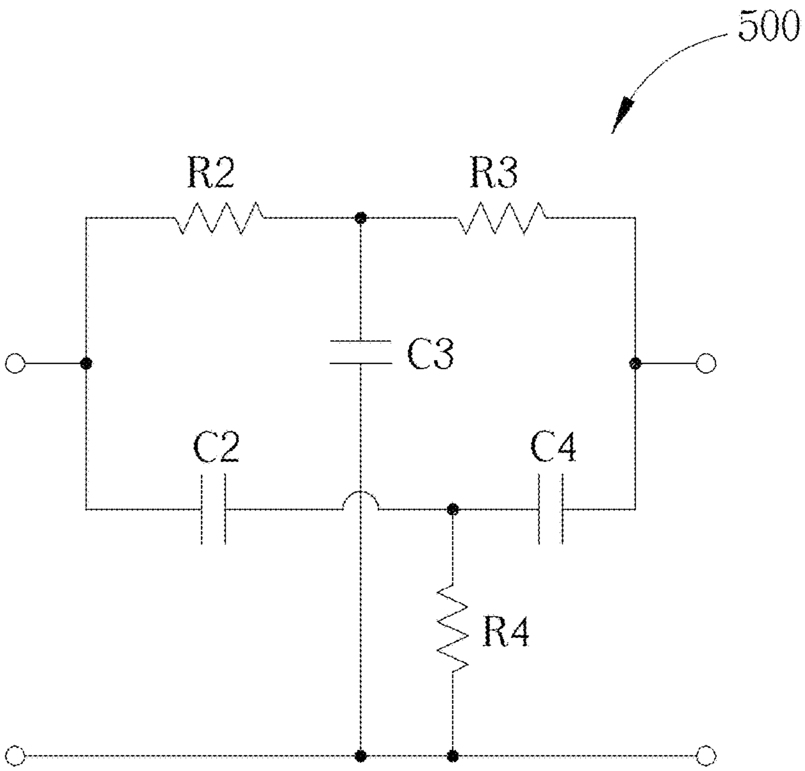
FIG. 5 is a diagram illustrating a filter according to an embodiment of the present invention.

FIG. 5 is a diagram illustrating a filter 500 according to an embodiment of the present invention, wherein the filter 220 shown in FIG. 2 and/or the filter 330 shown in FIG. 3 may be implemented by the filter 500. As shown in FIG. 5, the filter 500 is a notch filter including multiple resistors R2, R3, and R4 and multiple capacitors C2, C3, and C4, and is arranged to filter out harmonic components of the feedback signal VFB (e.g., second harmonic components or third harmonic components of the feedback signal VFB).

Figure 6:
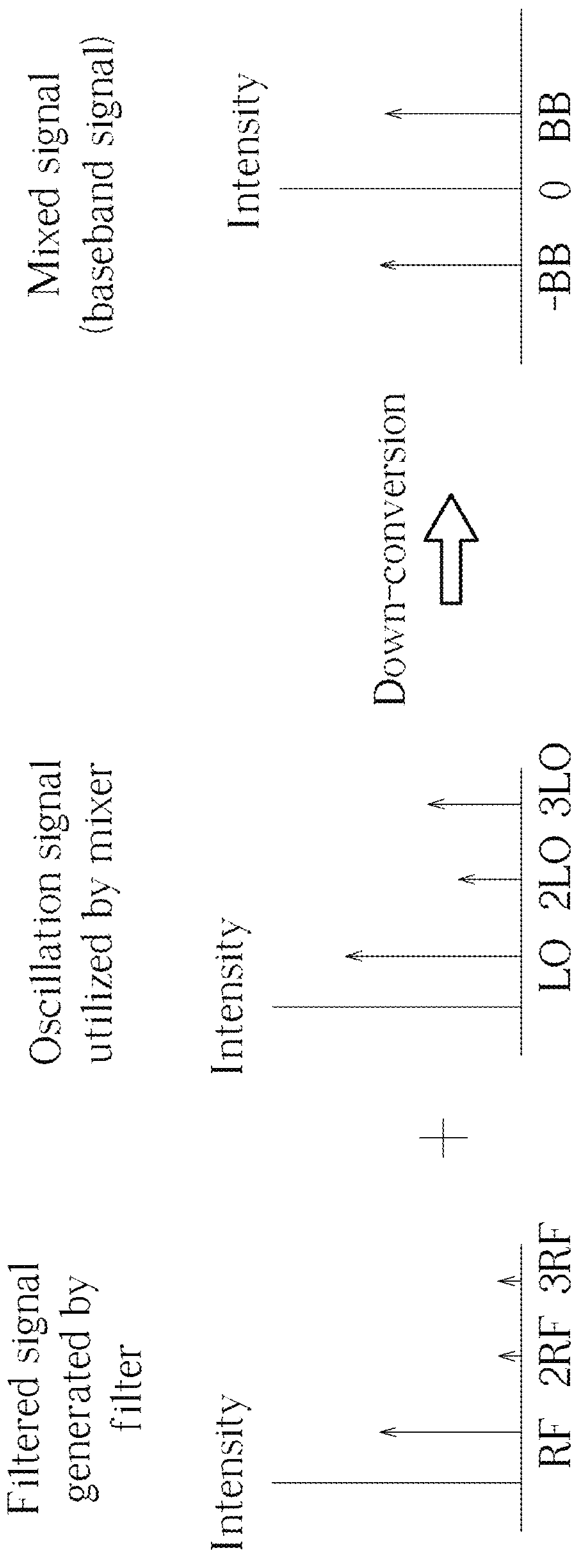
FIG. 6 is a diagram illustrating a filtered signal, an oscillation signal, and a mixed signal according to an embodiment of the present invention.

As mentioned in the above embodiments, by disposing the filter 220/330 between the matching circuit 210/310 and the mixer 230/340 for filtering out harmonic components of the feedback signal VFB, frequency multiplication components of the mixed signal (e.g., the baseband signal) generated by the mixer 230/340 can be reduced, which can facilitate subsequent circuit processing. As shown in FIG. 6, "RF", "2RF", and "3RF" are main components, second harmonic components, and third harmonic components of the feedback signal VFB, respectively, and "LO", "2LO", and "3LO" are main components, second harmonic components, and third harmonic components of the oscillation signal LO, respectively. Since intensities of the second harmonic components and the third harmonic components of the feedback signal VFB have been greatly reduced via the filter 220/330, the mixed signal generated by the mixer 230/340 will only have main components (BB) and mirror components (−BB), whereas other frequency multiplication components (e.g., 2BB, −2BB, 3BB, and −3BB) will only have quite low intensities which will not affect subsequent operations.

In addition, the mirror components of the mixed signal generated by the mixer 230/340 shown in FIG. 6 may be reduced or canceled by a digital calibration value generated by the RF transceiver circuit 140 performing an in-phase/quadrature (I/Q) calibration. For example, the RF transceiver circuit 140 may perform the I/Q calibration by adopting circuit configurations as shown in the following embodiments.

Figure 7:
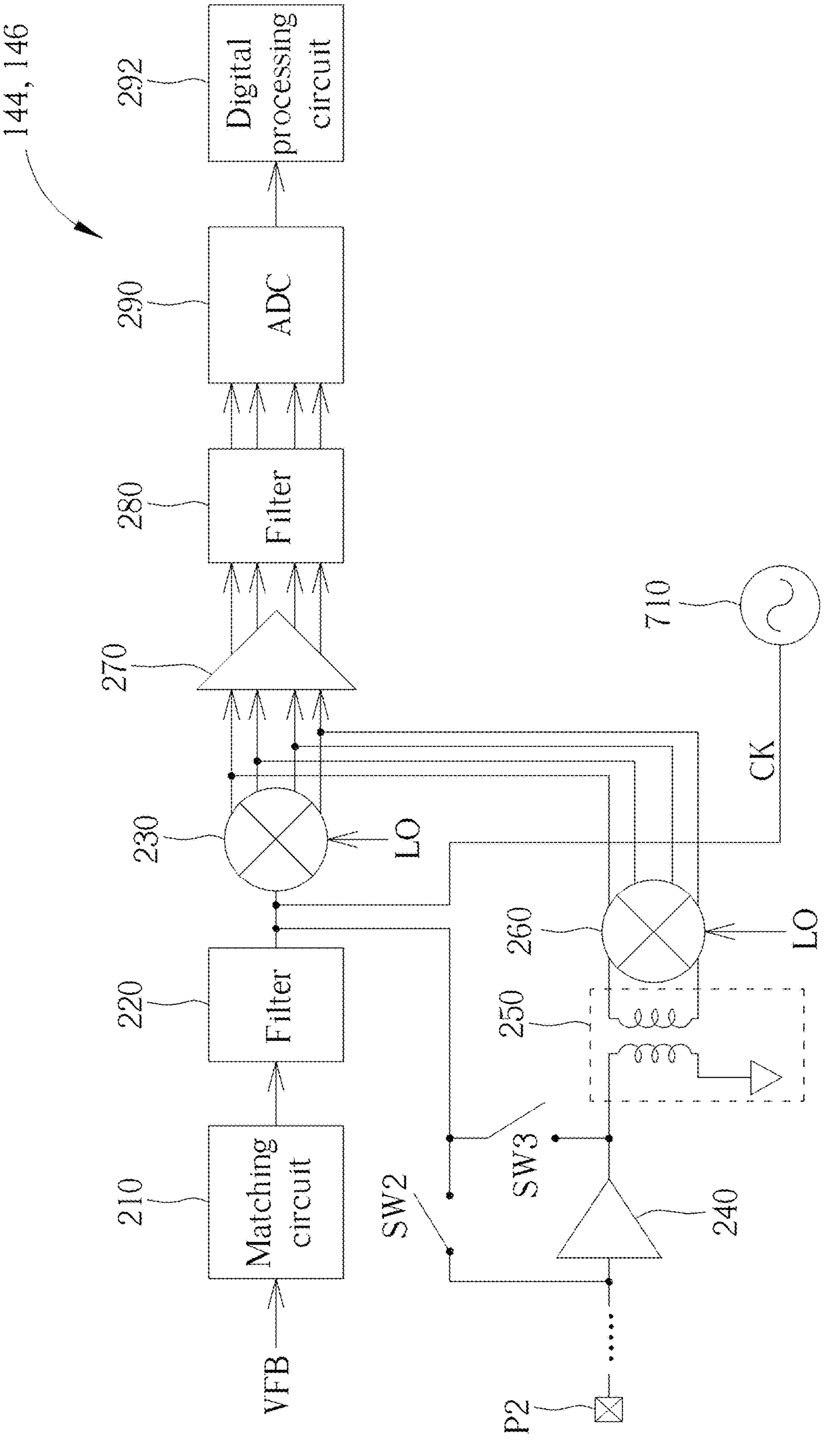
FIG. 7 is a diagram illustrating a reception circuit and a pre-distortion processing circuit according to an embodiment of the present invention.

FIG. 7 is a diagram illustrating the reception circuit 144 and the pre-distortion processing circuit 146 according to an embodiment of the present invention. Compared with the circuit configuration shown in FIG. 2, the circuit configuration shown in FIG. 7 further includes a clock generation circuit 710 for generating and transmitting a clock signal CK to the mixer 230. In this embodiment, the reception circuit 144 and the pre-distortion processing circuit 146 may perform the I/Q calibration periodically. During the I/Q calibration, the clock generation circuit 710 generates and transmits the clock signal CK to the mixer 230. The clock signal CK may be a single frequency signal, and a frequency of the clock signal CK may be close to that of the oscillation signal LO (e.g., the frequency of the clock signal CK may be that of the oscillation signal LO plus 4 MHz or other appropriate values). The mixer 230 performs a down-conversion operation upon the clock signal CK via the oscillation signal LO in order to generate and transmit the mixed signal to a back-end circuit for processing, such that the digital processing circuit 292 may generate a digital calibration value, wherein the digital calibration value is arranged to compensate the distortion of the I/Q signal caused by the mixer 230, the amplifier 270, the filter 280, and the ADC 290, and may be further arranged to cancel/reduce mirror components of the mixed signal.

Figure 8:
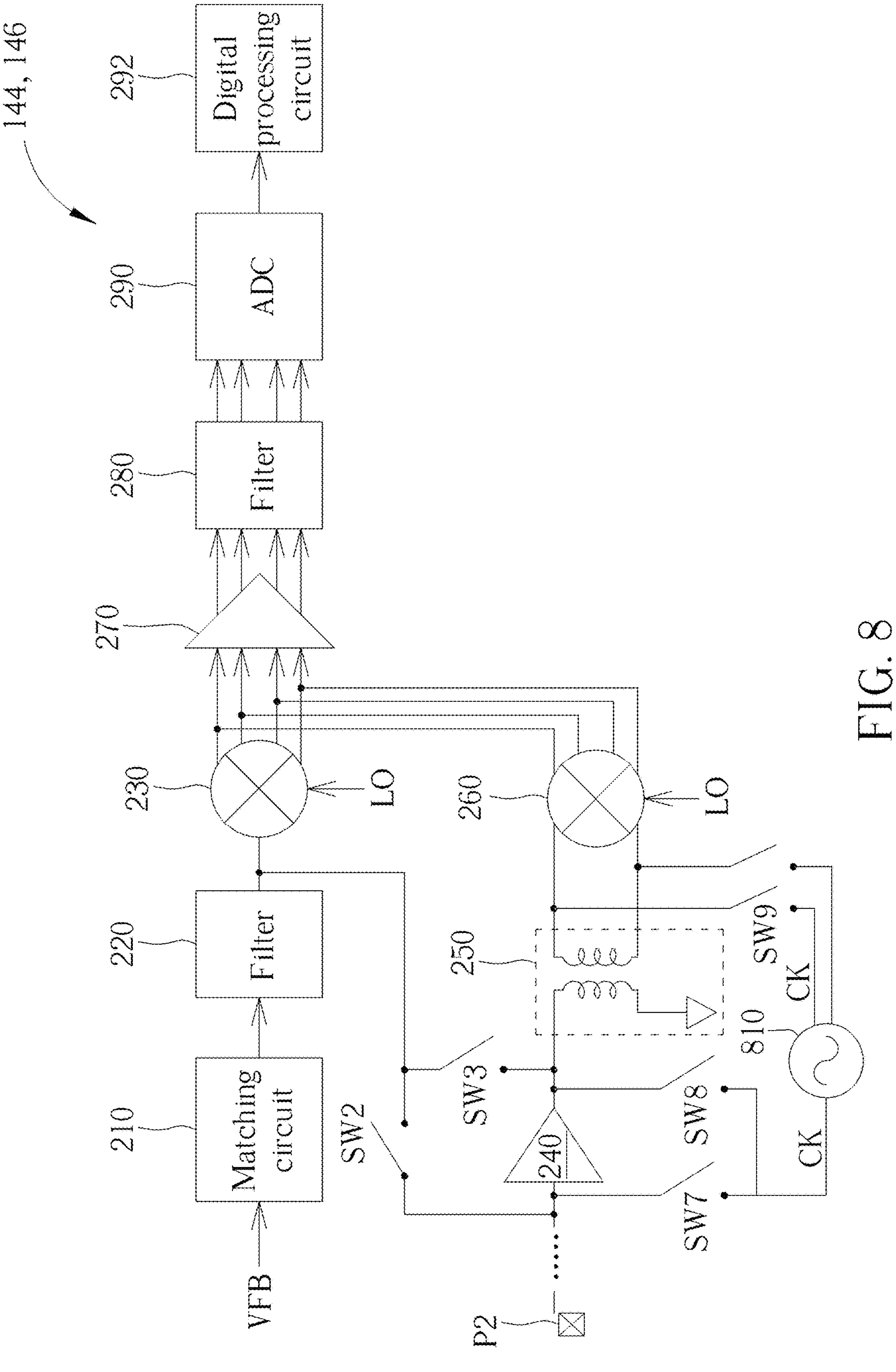
FIG. 8 is a diagram illustrating a reception circuit and a pre-distortion processing circuit according to an embodiment of the present invention.

FIG. 8 is a diagram illustrating the reception circuit 144 and the pre-distortion processing circuit 146 according to an embodiment of the present invention. Compared with the circuit configuration shown in FIG. 2, the circuit configuration shown in FIG. 8 further includes a clock generation circuit 810 and multiple switches SW7, SW8, and SW9 for generating and transmitting a clock signal CK to the mixer 260. In this embodiment, one of the switches SW7, SW8, and SW9 may be turned on. For example, the switch SW7 may be enabled so that the clock signal CK generated by the clock generation circuit 810 may be processed by the low-noise amplifier 240 and the transformer 250, and then input to the mixer 260. The switch SW8 may be enabled so that the clock signal CK generated by the clock generation circuit 810 may be processed by the transformer 250, and then input to the mixer 260. The switch SW9 may be enabled so that the clock signal CK generated by the clock generation circuit 810 may be directly input to the mixer 260. In this embodiment, the clock signal CK may be a single frequency signal, and a frequency of the clock signal CK may be close to that of the oscillation signal LO (e.g., the frequency of the clock signal CK may be that of the oscillation signal LO plus 4 MHz or other appropriate values). The mixer 260 performs a down-conversion operation upon the clock signal CK via the oscillation signal LO in order to generate and transmit the mixed signal to a back-end circuit for processing, such that the digital processing circuit 292 may generate a digital calibration value, wherein the digital calibration value is arranged to compensate the distortion of the I/Q signal caused by the mixer 260, the amplifier 270, the filter 280, and the ADC 290, and may be further arranged to cancel/reduce mirror components of the mixed signal.

Figure 9:
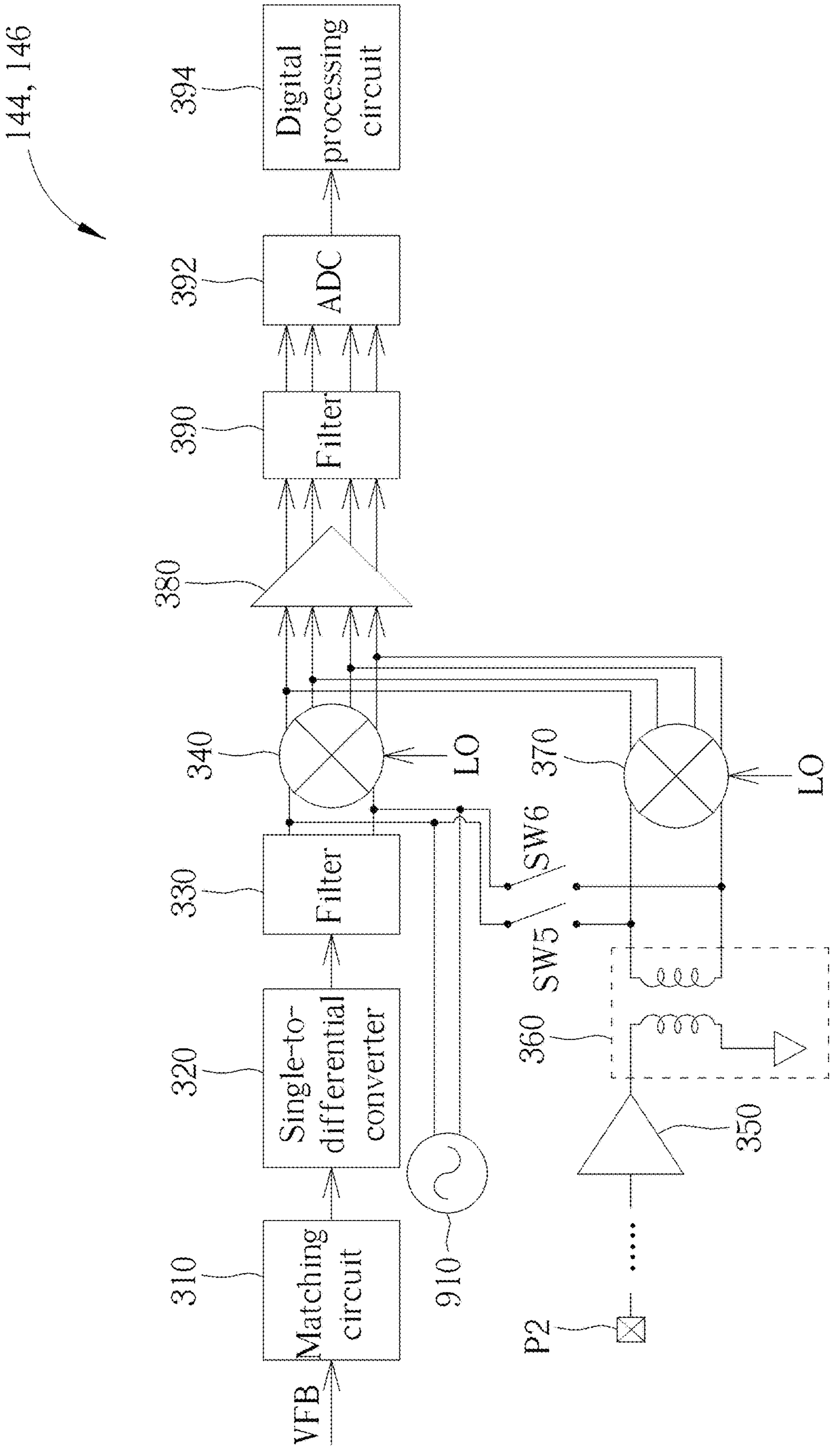
FIG. 9 is a diagram illustrating a reception circuit and a pre-distortion processing circuit according to an embodiment of the present invention.

FIG. 9 is a diagram illustrating the reception circuit 144 and the pre-distortion processing circuit 146 according to an embodiment of the present invention. Compared with the circuit configuration shown in FIG. 3, the circuit configuration shown in FIG. 9 further includes a clock generation circuit 910 for generating and transmitting a clock signal CK to the mixer 340. In this embodiment, the reception circuit 144 and the pre-distortion processing circuit 146 may perform the I/Q calibration periodically. During the I/Q calibration, the clock generation circuit 910 generates and transmits the clock signal CK to the mixer 340. The clock signal CK may be a single frequency signal, and a frequency of the clock signal CK may be close to that of the oscillation signal LO (e.g., the frequency of the clock signal CK may be that of the oscillation signal LO plus 4 MHz or other appropriate values). The mixer 340 performs a down-conversion operation upon the clock signal CK via the oscillation signal LO to in order to generate and transmit the mixed signal to a back-end circuit for processing, such that the digital processing circuit 394 may generate a digital calibration value, wherein the digital calibration value is arranged to compensate the distortion of the I/Q signal caused by the mixer 340, the amplifier 380, the filter 390, and the ADC 392, and may be further arranged to cancel/reduce mirror components of the mixed signal.

Figure 10:
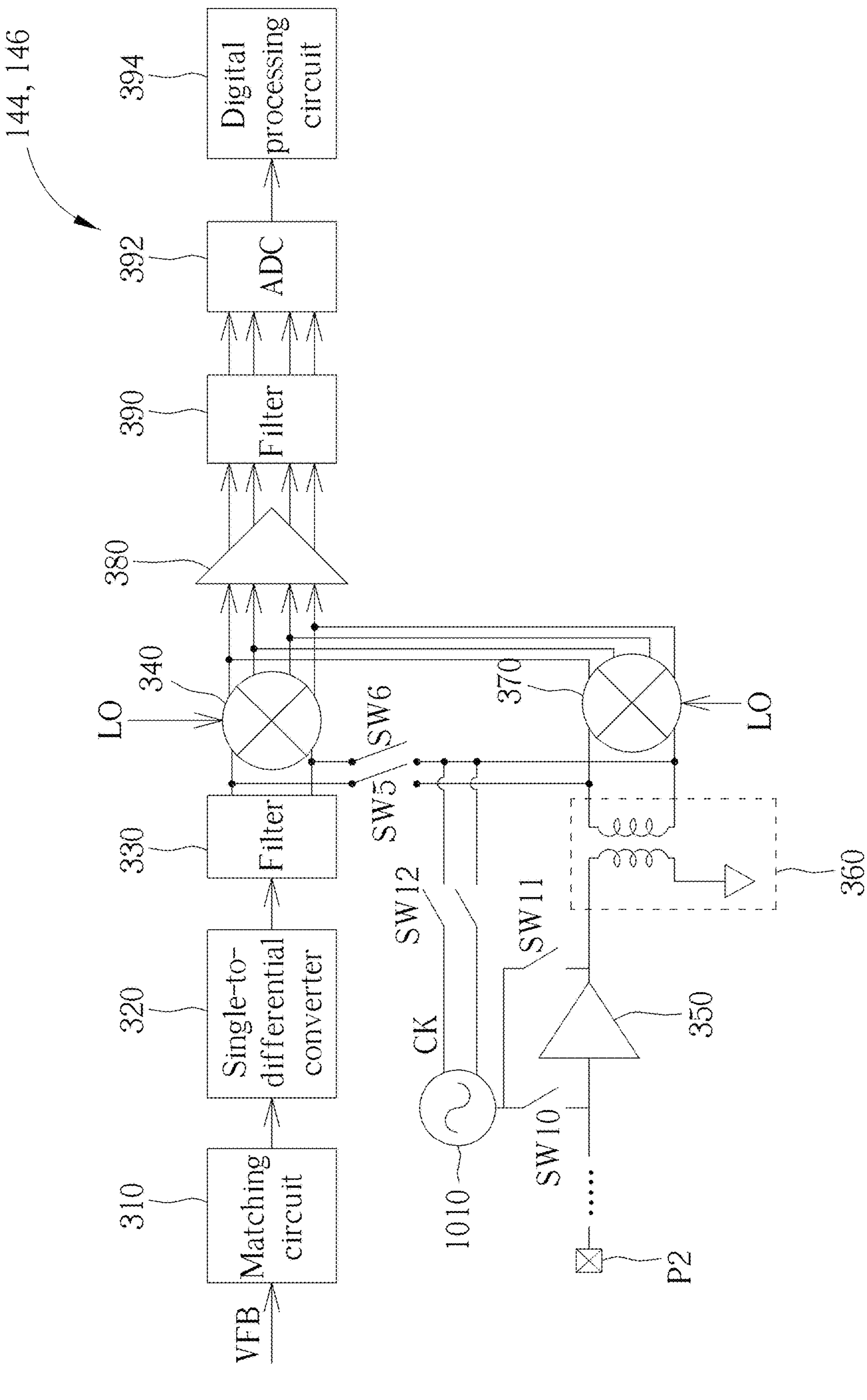
FIG. 10 is a diagram illustrating a reception circuit and a pre-distortion processing circuit according to an embodiment of the present invention.

FIG. 10 is a diagram illustrating the reception circuit 144 and the pre-distortion processing circuit 146 according to an embodiment of the present invention, wherein compared with the circuit configuration shown in FIG. 3, the circuit configuration shown in FIG. 10 further includes a clock generation circuit 1010 and multiple switches SW10, SW11, and SW12 for generating and transmitting a clock signal CK to the mixer 370. In this embodiment, one of the switches SW10, SW11, and SW12 may be turned on. For example, the switch SW10 may be enabled so that the clock signal CK generated by the clock generation circuit 1010 may be processed by the low-noise amplifier 350 and the transformer 360, and then input to the mixer 370. The switch SW11 may be enabled so that the clock signal CK generated by the clock generation circuit 1010 may be processed by the transformer 360, and then input to the mixer 370. The switch SW12 may be enabled so that the clock signal CK generated by the clock generation circuit 1010 may be directly input to the mixer 370. In this embodiment, the clock signal CK may be a single frequency signal, and a frequency of the clock signal CK may be close to that of the oscillation signal LO (e.g., the frequency of the clock signal CK may be that of the oscillation signal LO plus 4 MHz or other appropriate values). The mixer 370 performs a down-conversion operation upon the clock signal CK via the oscillation signal LO in order to generate and transmit the mixed signal to a back-end circuit for processing, such that the digital processing circuit 394 may generate a digital calibration value, wherein the digital calibration value is arranged to compensate the distortion of the I/Q signal caused by the mixer 370, the amplifier 380, the filter 390, and the ADC 392, and may be further arranged to cancel/reduce mirror components of the mixed signal.

The above filter design and calibration mechanism enables an RF transceiver circuit to generate appropriate signals for performing a pre-distortion operation.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A radio frequency (RF) transceiver circuit, comprising:

a transmission circuit, arranged to generate a transmission signal, wherein the transmission signal is transmitted to an antenna;

a reception circuit, arranged to receive a reception signal through the antenna; and a pre-distortion processing circuit, comprising:

a first filter, arranged to filter a feedback signal to filter out harmonic components of the feedback signal in order to generate a filtered signal, wherein the feedback signal is generated according to a coupling signal of the transmission signal;

a mixer, arranged to perform a down-conversion operation upon the filtered signal via an oscillation signal to generate a mixed signal;

a second filter, arranged to perform a low-pass filtering operation upon the mixed signal or an amplified signal to generate a low-pass filtered signal, wherein the amplified signal is generated by an amplifier performing an amplification operation upon the mixed signal;

an analog-to-digital converter, arranged to perform an analog-to-digital conversion operation upon the low-pass filtered signal to generate a digital signal; and a digital processing circuit, arranged to calculate distortion information of the transmission signal according to the digital signal, in order to generate and transmit a compensation signal to the transmission circuit for performing a pre-distortion compensation operation;

wherein when the RF transceiver circuit performs an in-phase/quadrature (I/Q) calibration, the mixer performs the down-conversion operation upon a clock signal via the oscillation signal to generate the mixed signal, in order for the digital processing circuit to generate a digital calibration value.

2. The RF transceiver circuit of claim 1, wherein the pre-distortion processing circuit further comprises:

a single-to-differential converter, arranged to convert the feedback signal into a differential signal;

wherein the first filter is arranged to filter the differential signal to generate the filtered signal.

3. The RF transceiver circuit of claim 1, wherein the reception circuit comprises:

a low-noise amplifier;

a transformer; and the mixer;

wherein when the RF transceiver circuit operates in a reception mode, the reception signal is sequentially processed by the low-noise amplifier, the transformer, and the mixer;

wherein when the RF transceiver circuit operates in a test mode, the pre-distortion processing circuit utilizes the mixer to calculate the distortion information of the transmission signal according to the feedback signal, in order to generate and transmit the compensation signal to the transmission circuit for performing the pre-distortion compensation operation.

4. The RF transceiver circuit of claim 1, further comprising:

a clock generation circuit, arranged to generate and transmit the clock signal to the mixer.

5. The RF transceiver circuit of claim 1, further comprising:

a clock generation circuit, arranged to generate the clock signal; and the reception circuit comprises:

a low-noise amplifier;

a transformer; and the mixer;

wherein the clock signal is input to the mixer after the clock signal is at least processed by the transformer.

6. The RF transceiver circuit of claim 5, wherein the clock signal is input to the mixer after the clock signal is processed by the low-noise amplifier and the transformer.

7. A circuit set, comprising:

an external front-end module, comprising a power amplifier and a low-noise amplifier, wherein the power amplifier is arranged to amplify a transmission signal for transmitting through an antenna; and the low-noise amplifier is arranged to receive a reception signal through the antenna;

a coupler, arranged to generate a coupling signal according to the transmission signal;

a matching circuit, arranged to generate a feedback signal according to the coupling signal; and a radio frequency (RF) transceiver circuit, comprising a pre-distortion processing circuit, wherein the pre-distortion processing circuit comprises:

a first filter, arranged to filter the feedback signal to filter out harmonic components of the feedback signal in order to generate a filtered signal;

a mixer, arranged to perform a down-conversion operation upon the filtered signal via an oscillation signal to generate a mixed signal;

a second filter, arranged to perform a low-pass filtering operation upon the mixed signal to generate a low-pass filtered signal;

an analog-to-digital converter, arranged to perform an analog-to-digital conversion operation upon the low-pass filtered signal to generate a digital signal; and a digital processing circuit, arranged to calculate distortion information of the transmission signal according to the digital signal, in order to generate a compensation signal for performing a pre-distortion compensation operation;

wherein when the RF transceiver circuit performs an in-phase/quadrature (I/Q) calibration, the mixer performs the down-conversion operation upon a clock signal via the oscillation signal to generate the mixed signal, in order for the digital processing circuit to generate a digital calibration value.

8. The circuit set of claim 7, wherein the pre-distortion processing circuit further comprises:

a single-to-differential converter, arranged to convert the feedback signal into a differential signal;

wherein the first filter is arranged to filter the differential signal to generate the filtered signal.

9. The circuit set of claim 7, wherein the low-noise amplifier is a first low-noise amplifier, the RF transceiver circuit further comprises a reception circuit, and the reception circuit comprises:

a second low-noise amplifier;

a transformer; and the mixer;

wherein when the RF transceiver circuit operates in a reception mode, the reception signal is sequentially processed by the second low-noise amplifier, the transformer, and the mixer;

wherein when the RF transceiver circuit operates in a test mode, the pre-distortion processing circuit utilizes the mixer to calculate the distortion information of the transmission signal according to the feedback signal, in order to generate and transmit the compensation signal to the transmission circuit for performing the pre-distortion compensation operation.

* * * * *